Figure 3:
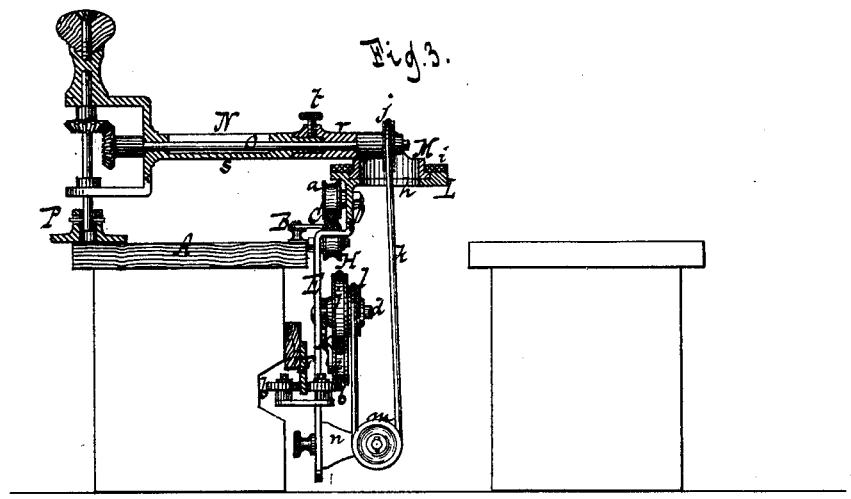

2 Sheets—Sheet 1.
A. WARTH.
Mechanical Movement.
No. 220,007. Patented Sept. 23, 1879.
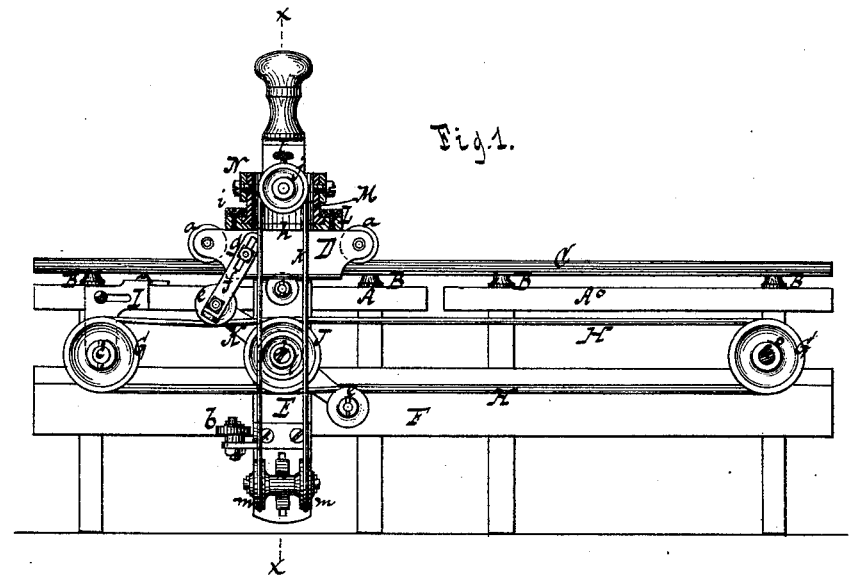
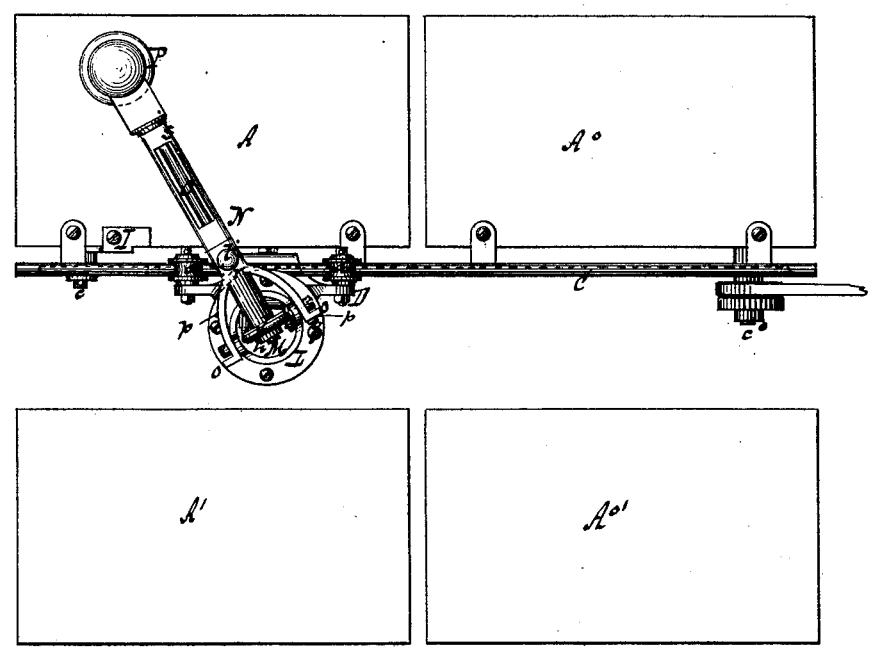
Witnesses
Otto Hufeland
William Miller
Inventor
Albin Warth.
by Van Santvoord & Hauff
his attorneys.

UNITED STATES PATENT OFFICE.

ALBIN WARTH, OF STAPLETON, NEW YORK.

IMPROVEMENT IN MECHANICAL MOVEMENTS.

Specification forming part of Letters Patent No. 220,007, dated September 23, 1879; application filed July 31, 1879.

*To all whom it may concern:*

Be it known that I, ALBIN WARTH, of Stapleton, in the county of Richmond and State of New York, have invented a new and useful Improvement in Mechanical Movements, which improvement is fully set forth in the following specification, reference being had to the accompanying drawings, in which—

Figure 1 represents a side view. Fig. 2 is a plan or top view. Fig. 3 is a transverse section in the plane *x x*, Fig. 1.

Similar letters indicate corresponding parts.

This invention relates to certain improvements on that class of mechanical movements which are composed of a carriage acted on by a belt that receives a continuous motion from some source, said carriage being provided with a pulley, from which motion is transmitted to a working machine, as fully described in Letters Patent No. 151,457, granted to me May 26, 1874, and in Letters Patent No. 172,802, dated January 25, 1876.

My present improvement consists in the combination, with the carriage and the carriage-supporting rail, of a traveling belt running on pulleys mounted on horizontal pins or axles, a bracket extending downward from the carriage, a transmitting-disk mounted on a pin extending from said bracket and situated between the two strands of the traveling belt, and mechanism for pressing the traveling belt against said disk from opposite sides, so that the traveling belt can be extended to any desired length without danger that the same will run off from its pulleys; also, in the combination, with the carriage, the carriage-supporting rail, the traveling belt and its supporting-pulleys, the bracket, and the transmitting-disk which is mounted on said bracket and acted upon by the traveling belt, of two pulleys mounted on the bracket and a guide-rail extending through between said pulleys, so as to steady the carriage in its movement; further, in the combination, with the carriage, the carriage-supporting rail, the traveling belt, the bracket, and the transmitting-disk which is mounted on said bracket and acted upon by the traveling belt, of an open platform extending from the carriage, a tube fitted into said platform and adapted to swivel therein, an arm which is hinged at one end to said tube and supports at its opposite end the mechanism or working machine to which motion is to be transmitted, a shaft which has its bearing in said swivel-arm and is geared together at one end with the working machine and provided at its opposite end with a pulley situated over the opening in the platform, and a belt which connects said pulley with the transmitting-disk which is acted upon by the traveling belt, so that the motion from said disk can be transmitted directly to the shaft in the swivel-arm by means of a belt; also, in the combination, with the carriage, the carriage-supporting rail, the traveling belt, the bracket, the transmitting-disk which is mounted on said bracket and acted upon by the traveling belt, and the pulley mounted on the end of the shaft in the swivel-arm, of a pulley secured to said transmitting-disk and two guide-pulleys mounted on a horizontal shaft which has its bearings in a standard extending from the bracket of the carriage, so that the belt which imparts motion to the shaft in the swivel-arm can readily follow the motions of the swivel-arm without danger of being thrown off from its pulleys; further, in the combination, with the platform which extends from the carriage and supports the swivel-arm, of a removable stop adapted to be secured in the platform and to act on the swivel-arm, so as to limit the motion of said arm and to prevent the working machine attached thereto from being thrown off from the table over which it is intended to work; also, in the combination, with the working machine and with the shaft which transmits motion to the same, of a swivel-arm made in two parts, one of which connects with the carriage and is provided with a socket to receive the end of the other part, which can be fastened by a set-screw, so that by releasing this set-screw the working-machine can be turned clear round for the purpose of facilitating repairs or other changes.

In the drawings, the letters A A⁰ designate two tables, which are placed alongside of each other, and from each of which rise two or more posts, B, which form the supports for a rail, C, on which travels the carriage D by means of two grooved wheels, *a a*. From this carriage extends a bracket, E, downward, and on this bracket are fastened two rollers, b b, which revolve freely on vertical pins, and which bear from opposite sides against a rail, F, that is firmly secured to the legs of the tables A $A^0$ beneath the supporting-rail C and parallel to the same. By these means the carriage is steadied in its movements on the supporting-rail, so that it is not liable to be thrown out of its proper position by the evolutions of the working machine.

In the sides of the tables A $A^0$, near their extreme ends, are secured two arbors, on each of which is mounted a pulley, G, said arbors being at right angles to the supporting-rail C and in horizontal position, so that the pulleys G G are situated in vertical planes. These pulleys support the traveling belt H, and one of the arbors, c, is fastened in a bracket, I, which can be adjusted on its table A toward and from the other arbor, $c^0$, for the purpose of regulating the tension of the traveling belt H. By turning the arbor $c^0$ motion is imparted to the pulleys G G and to the belt H. Between the two strands of this belt is situated a disk, J, which revolves freely on a stud, d, that projects from and is firmly fastened in the bracket E. On this stud swings a two-armed lever, K, which carries at its ends two pulleys, e e, and which can be adjusted in position by a slotted link, f, and set-screw g. (See Fig. 1.) The pulleys e e are in such positions that the same, when the lever K is turned to the position shown in Fig. 1, bear from opposite sides against the strands of the traveling belt H, and press the same against the disk J, so that the motion of said belt is transmitted to the disk, whatever may be the position of the carriage D on its supporting-rails C.

From this description it will be seen that the traveling belt H runs on pulleys, which revolve in vertical planes, and I am enabled to extend this belt to almost any desired length, certainly along the sides of two or more tables, A $A^0$, without danger that the same may run off from its pulleys, and I can use a flat traveling belt, which is a decided improvement over the device described in my Patents Nos. 151,457 and 172,802, above mentioned, in which the traveling belt runs on horizontal pulleys, so that grooved pulleys and round belts are essential, and great care is required to prevent the same from running off from its pulleys.

From the carriage D projects a horizontal platform, L, with a circular opening, h, into which is fitted a tube, M, which is held in position by a cover, i, secured to the platform, and which can freely turn in either direction. To the tube M is pivoted the bifurcated end of an arm, N, which forms the bearing for a shaft, O, and to the outer end of which is secured a working-machine, P, of any desired construction.

On the shaft O, right above the center of the opening h in the platform L, is mounted a pulley, j, which connects by means of a belt, k, with a pulley, l, fastened to the disk J, which is situated between and acted upon by the two strands of the traveling belt, so that the motion from this belt is transmitted to the pulley j and shaft O. The belt k, instead of running directly from the pulley l to the pulley j, is carried down under guide-pulleys m, Figs. 1 and 3, which are mounted on a horizontal axle that has its bearing in a standard, n, secured to the bracket E. If the swivel-arm N is swung round in a horizontal plane the belt k becomes twisted, and if it was carried directly from the pulley l to pulley k it would be liable to run off. This danger is prevented by the guide-pulleys m, which prevent the belt from being twisted on the pulley l, and confine the twist to that portion of the belt situated between said guide-pulleys and the pulley j.

In operating this mechanism the swivel-arm N is liable to be flung around in a horizontal plane by the action of the belt k, and if the tables A $A^0$ are not wide enough the working machine is thrown over the edge of the table. This difficulty I have obviated by providing the bifurcated end of the swivel-arm with ears o, and in the platform L are two or more holes, p, Fig. 2, to receive a pin, q, which forms a stop for either one or the other of the ears o to strike against, and to prevent the swivel-arm from being turned so as to throw the working machine over the edge of the table.

The swivel-arm N is made in two parts—viz., the inner bifurcated part, r, and the outer part, s, to which the working machine is attached. The part r is provided with a socket to receive the inner tubular end of the part s, (see Fig. 3,) which forms the bearing for the shaft O, and can be fastened in position by a set-screw, t. When this set-screw is loose the part s of the swivel-arm, together with the working-machine, can be turned round in the socket of the part r, and easy access is obtained to the operating parts of said working machine for repairs or other changes.

If desired, the swivel-arm N may be brought in such a position that the working machine will work on tables $A^1 A^{01}$, placed opposite the tables A $A^0$, as shown in Fig. 2.

What I claim as new, and desire to secure by Letters Patent, is—

1. In a mechanical movement, the combination, with a carriage and a carriage-supporting rail, of a traveling belt running on pulleys mounted on horizontal pins or axles, a bracket extending downward from the carriage, a transmitting-disk mounted on a pin extending from said bracket and situated between the two strands of the traveling belt, and mechanism for pressing the traveling belt against said disk from opposite sides, substantially as and for the purpose described.

2. In a mechanical movement, the combination, with a carriage, a carriage-supporting rail, a traveling belt, and two pulleys, G G, supporting the same, a bracket, and a transmitting-disk which is mounted on said bracket and acted upon by the traveling belt, of two pulleys mounted on the bracket and a guide-rail extending through between said pulleys for steadying the carriage in its movements, substantially as described.

3. In a mechanical movement, the combination, with a carriage, a carriage-supporting rail, a traveling belt, a bracket, and a transmitting-disk which is mounted on said bracket and acted upon by the traveling belt, of an open platform extending from the carriage, a tube fitted into said platform and adapted to swivel therein, an arm which is hinged at one end to said tube and supports at its opposite end the mechanism or working machine to which motion is to be transmitted, a shaft which has its bearing in said swivel-arm and is geared with the working machine at one end and provided at its opposite end with a pulley situated over the opening in the platform, and a belt which connects said pulley with the transmitting-disk acted upon by the traveling belt, all constructed and adapted to operate substantially as described.

4. In a mechanical movement, the combination, with a carriage, a carriage-supporting rail, a traveling belt, a bracket, a transmitting-disk which is mounted on said bracket and acted upon by the traveling belt, a swivel-arm supporting the mechanism or working-machine, and a shaft which is geared with the working machine at one end and provided with a pulley at its opposite end, of a pulley secured to said transmitting-disk and two guide-pulleys mounted on a horizontal shaft which has its bearings in a standard extending from the bracket, all constructed and adapted to operate substantially as described.

5. In a mechanical movement, the combination, with a carriage and a platform which extends from the carriage and supports a swivel-arm, of a removable stop adapted to be secured in the platform and to act on the swivel-arm, substantially as shown and described.

6. In a mechanical movement, the combination, with a working machine and a shaft combined with mechanism for transmitting motion thereto, of a swivel-arm which supports said machine and is made in two parts, one of which is provided with a socket to receive the end of the other part, and the two fastened or locked together by a suitable device or means to prevent their accidental detachment, all constructed and adapted to operate substantially as described.

In testimony that I claim the foregoing I have hereunto set my hand and seal this 28th day of July, 1879.

ALBIN WARTH. [L. S.]

Witnesses:
E. F. KASTENHUBER,
J. VAN SANTVOORD.